US 11,986,870 B2

(12) United States Patent
Ruiz et al.

(10) Patent No.: US 11,986,870 B2
(45) Date of Patent: May 21, 2024

(54) REACTOR FOR THE HYDROTHERMAL OXIDATION TREATMENT OF AN ORGANIC MATERIAL IN A REACTION MEDIUM

(71) Applicant: COMMISSARIAT À L'ÉNERGIE ATOMIQUE ET AUX ÉNERGIES ALTERNATIVES, Paris (FR)

(72) Inventors: Jean-Christophe Ruiz, Laudun l'Ardoise (FR); Hubert-Alexandre Turc, Les Angles (FR); Antoine Leybros, Bagnols sur Ceze (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 654 days.

(21) Appl. No.: 17/251,349

(22) PCT Filed: Jun. 13, 2019

(86) PCT No.: PCT/FR2019/051425
§ 371 (c)(1),
(2) Date: Dec. 11, 2020

(87) PCT Pub. No.: WO2019/239069
PCT Pub. Date: Dec. 19, 2019

(65) Prior Publication Data
US 2021/0276058 A1    Sep. 9, 2021

(30) Foreign Application Priority Data
Jun. 14, 2018 (FR) ........................................ 1855247

(51) Int. Cl.
*B09B 3/40* (2022.01)
*C02F 1/72* (2023.01)

(52) U.S. Cl.
CPC .................. *B09B 3/40* (2022.01); *C02F 1/72* (2013.01); *C02F 2201/003* (2013.01)

(58) Field of Classification Search
None
See application file for complete search history.

(56) References Cited

U.S. PATENT DOCUMENTS 6,939,521 B1 * 9/2005 Chiu ........................ B01J 3/046
422/208
7,329,395 B2 * 2/2008 Akai ........................ G21F 9/04
422/291

(Continued)

FOREIGN PATENT DOCUMENTS

EP    0708058 A2    4/1996
WO    9302969 A1    2/1993

(Continued)

OTHER PUBLICATIONS

International Search Report for PCT/FR2019/051425 dated Sep. 24, 2019.

(Continued)

*Primary Examiner* — Jelitza M Perez
(74) *Attorney, Agent, or Firm* — Pearne & Gordon LLP (57) ABSTRACT

A reactor for hydrothermal oxidation treatment of an organic material in a reaction medium, comprising: a confinement member housed in a chamber and defining a confinement zone and a peripheral zone; at least one inlet for an oxidising fluid into the peripheral zone; a first cooling system, with an external circulation cold loop having a fluid inlet and outlet, opening into a first portion of the peripheral zone; a heating system, with an external circulation hot loop having a fluid inlet and outlet opening into a second portion of the peripheral zone; a channel with a mouth, a channel stirring system; a second cooling system for creating a temperature gradient along the channel between a cold temperature and the (Continued)

reaction temperature; each circulation loop being equipped with a circulator and with a heat exchanger.

10 Claims, 4 Drawing Sheets

(56) References Cited

U.S. PATENT DOCUMENTS

| | | |
|---|---|---|
| 2007/0201304 A1 | 8/2007 | Joussot-Dubien et al. |
| 2008/0279728 A1 | 11/2008 | Ture et al. |
| 2009/0127209 A1 | 5/2009 | Ture et al. |
| 2009/0186153 A1 | 7/2009 | Hertz et al. |
| 2010/0143608 A1 | 6/2010 | Ruiz et al. |
| 2015/0352391 A1 | 12/2015 | Ruiz et al. |
| 2017/0056852 A1 | 3/2017 | Ruiz et al. |
| 2020/0276555 A1 | 9/2020 | Ruiz et al. |

FOREIGN PATENT DOCUMENTS

| | | |
|---|---|---|
| WO | 0230836 A1 | 4/2002 |
| WO | 2007036526 A2 | 4/2007 |
| WO | 2013034632 A2 | 3/2013 |
| WO | 2014111581 A1 | 7/2014 |

OTHER PUBLICATIONS

Written Opinion for PCT/FR2019/051425 dated Sep. 24, 2019.
Search Report for French application No. FR1855247 dated Feb. 28, 2019.

* cited by examiner

REACTOR FOR THE HYDROTHERMAL OXIDATION TREATMENT OF AN ORGANIC MATERIAL IN A REACTION MEDIUM

CROSS-REFERENCE TO RELATED APPLICATIONS

This is a National Stage application of PCT international application PCT/FR2019/051425, filed on Jun. 13, 2019, which claims the priority of French Patent Application No. 1855247, filed Jun. 14, 2018, both of which are incorporated herein by reference in their entirety.

TECHNICAL FIELD

The field of the invention is that of hydrothermal or wet oxidation treatment of an organic material.

The invention finds application in particular to the destruction of organic materials such as liquid hazardous industrial waste such as, for example, halogenated solvents, toxic organic effluents, pharmaceutical, biological or contaminated effluents, and/or solid hazardous industrial waste (for example Ion Exchange Resins (IER)).

STATE OF PRIOR ART

HydroThermal Oxidation (HTO) and Wet Oxidation (WO) allow, by means of pressurised water at a certain temperature and in the presence of an oxidant, the total or partial decomposition of organic material (such as halogenated or non-halogenated organic effluents, with or without a high Net Calorific Value (NCV)). The oxidant can be air, pure oxygen, in gaseous or liquid form, such as hydrogen peroxide or nitric acid.

In the case of HTO, the mixture of the oxidant and water, which solubilises the organic material, is carried out in a pressurised enclosure (also called an autoclave) maintained at a temperature between 400 and 550° C. and at a pressure above the water critical pressure (i.e. 221 bar), thereby forming a homogeneous single-phase mixture. It is under these conditions that the organic material is oxidised. In the case of WO, the enclosure is maintained at a temperature below the water critical temperature (i.e. 374° C.), and at a pressure below the water critical pressure (i.e. 221 bar).

The oxidation technique in a supercritical medium has been first implemented within an enclosure with a simple tubular geometry. This geometry proved to be effective from a reaction point of view, but very limited when treating halogenated compounds due to corrosion phenomena occurring at the walls, as well as the deposition of mineral compounds causing plugs to be formed.

Figure 1:
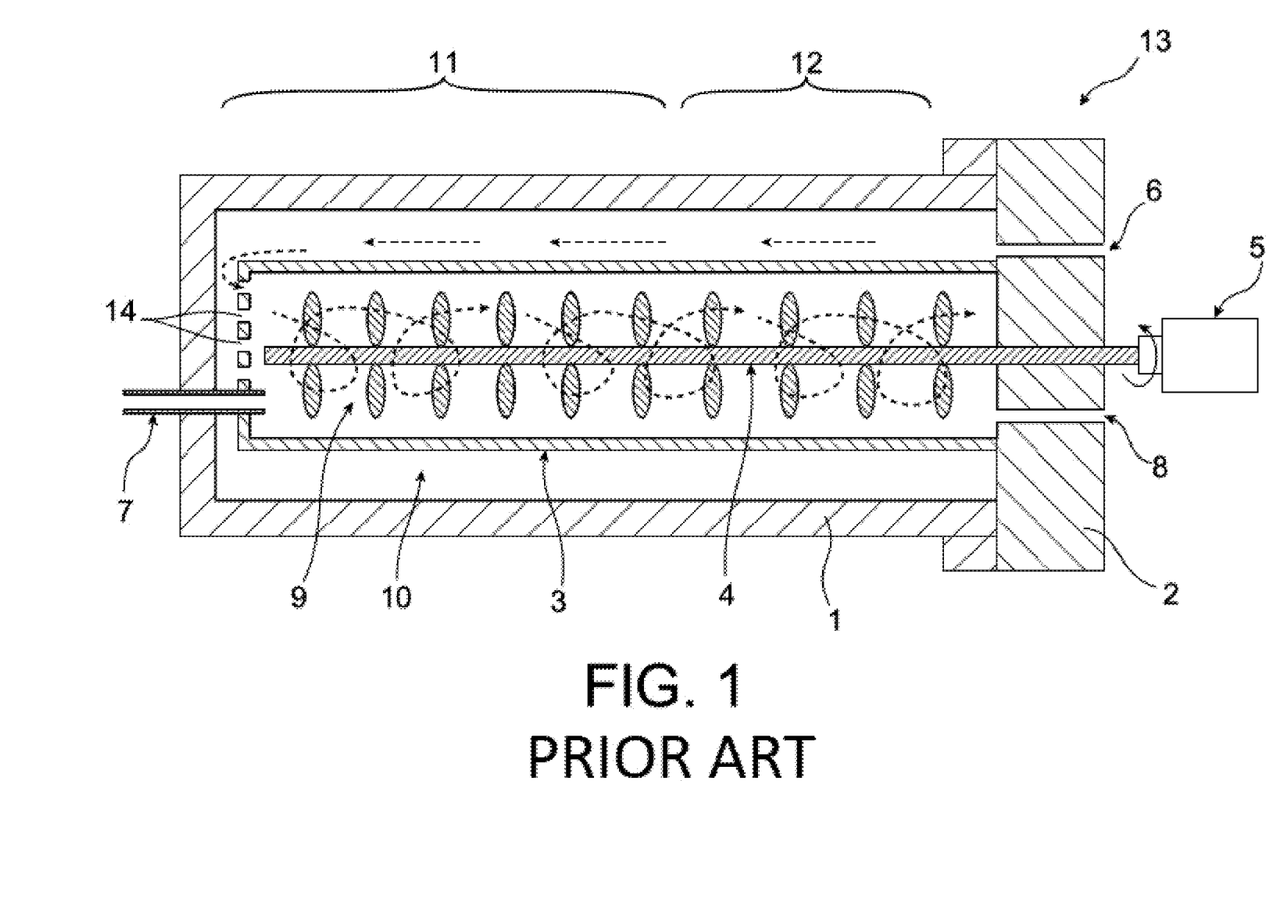
FIG. 1, already described, represents a cross-section view of a stirred double jacket continuous reactor according to prior art.

To solve these problems of corrosion and salt build-up, the use of a continuous hydrothermal oxidation reactor with a stirred double jacket has been provided (documents [1], [2] and [3]), as illustrated in FIG. 1.

Reactor 13 comprises a tubular-shaped enclosure 1, resisting to operating pressure and temperature, which is closed by a tightness flange 2 kept cold by active cooling. Reactor enclosure 1 has two properly distinct zones, namely a zone 11 kept at operating temperature (hot zone) by independent heating means and a zone 12 kept cold (cold zone) by independent cooling means.

A confinement tube 3 is located inside enclosure 1 and is kept tight by a simple O-ring seal in contact with the cold flange 2. This confinement tube 3 delimits a reaction zone 9, located inside the tube, and an annular zone 10, between the upper surface of the tube and the inner wall of enclosure 1.

The confinement tube 3 fluidly communicates, on the hot zone (operating temperature) side, the reaction zone 9 with the annular zone 10 through at least one opening 14.

Confinement tube 3 is not subjected to mechanical pressure stress and confines the HTO or WO reaction to reaction zone 9. This confinement is made both statically, due to the presence of the confinement tube which forms a screen for reaction zone 9, and dynamically, due to the circulation of fluids upon operating the reactor. This confinement tube 3 is designed to withstand chemical aggressions induced by the reaction and can be easily replaced by disassembling the cold flange 2. This confinement tube also acts as a counter-current heat exchanger between reagents to be preheated (oxidant+water) and hot fluids (effluents) coming from the reaction zone. Thus, reagents required for the HTO or WO reaction (oxidant+water) are fed at the operating flow rate via the cold flange 2 and circulate in annular zone 10 to the hot end of the reactor enclosure, then enter reaction zone 9. In that place, the reagents (oxidant+water) meet the organic materials which are injected at the operating flow rate at a single tubular feed 7 located at the hot end of the reactor enclosure. The treated material (effluent) leaves the reaction zone through an outlet 8.

A stirring system, equivalent to a turbine, comprising a shaft provided with blades, is located in the confinement tube. The shaft is rotated by an external electric motor 5. The stirring system 4 is to homogenise the reaction medium and facilitates heat transfer between the reaction zone 9 and the wall of the confinement tube 3. The stirring system 4, like the confinement tube 3, is made of a material withstanding chemical aggressions induced by the reaction and axial temperature gradients along the reactor enclosure. This stirring system can be easily replaced by disassembling the cold flange 2.

There are also heating means and cooling means arranged:
  outside enclosure 1 of the reactor and at atmospheric pressure, through heating resistors (for example heating collars) or chilled water circulation double jackets (documents [1] and [2]);
  inside enclosure 1 of the reactor, at operating pressure, through resistors or coolant fluid circuits dipped into the annular zone and sufficiently close to reaction zone 9, while being protected from aggressions by confinement tube 3 (document [3]).

However, these reactors of prior art can be further improved. In particular, these reactors have the following limitations.

The use of a confinement tube 3 implies the presence of an annular zone 10 in equi-pressure with the reaction zone 9. This configuration makes it possible to delimit a volume protected from chemical aggressions induced by the HTO or WO reaction. This volume has a fluid passing therethrough, said fluid being comprised of water and oxidant, which will be called "oxidising fluid", which is heated by heat exchange with the fluid resulting from the reaction on the one hand (located on the lower surface of the confinement tube), and by independent heating means on the other hand (heating resistors external to the confinement tube 3 or reactor enclosure 1). In documents [1], [2] and [3], the oxidising fluid is used as a heat transfer medium, which allows heat transfer from the upper surface of the confinement tube to the surface of a heat exchanger dipped into the annular zone or to the surface of the reactor enclosure wall.

The flow of this oxidising fluid is made at a feed flow rate required by the HTO or WO reaction needs, which can lead, in cases encountered experimentally, to a very weakly turbulent or even laminar flow. On the other hand, if under supercritical water temperature conditions, water and the possibly gaseous oxidant, such as air or oxygen, form a homogeneous mixture, the same is not true under subcritical temperature conditions encountered in the cold zone of the reactor. It is therefore not excluded that a separation of the liquid and gaseous phases takes place in the annular zone at low temperature, leading to a stratification in the flow, the aqueous phase installing in the lower part and the gaseous phase in the upper part. Such stratification would be detrimental to the homogeneity of heat transfer and could even lead to equipment damage due to the local absence of water; for example, in case an air pressurised titanium double jacket is heated but in the absence of water, the oxidation of titanium can lead to pyrophoric behaviour. It would therefore be desirable to be able to act on the flow regime in annular zone 10, irrespective of the feed rate 6 required by the reaction.

Furthermore, long duration experimental tests have highlighted a weak tightness at the connections, under pressure and temperature, of the feed 7 of organic material to be decomposed (cold waste). In addition to the mechanical stress there are also, on these connections, temperature cycles during reactor start-up and shutdown phases. It is therefore necessary to change these connections regularly to maintain proper tightness over time.

In addition, as the cold waste feed rates are relatively low compared to other flows entering and leaving enclosure 1, this feed 7 is generally carried out with a very small diameter tubing. However, as the oxidant is generally not present in this tubing, the latter is subject to clogging by waste pyrolysis.

The concept of the stirred double jacket continuous reactor (confinement member and confinement tube) has been widely used for various continuous or semi-continuous WO and HTO applications. Some applications involving compounds including heteroatoms such as S, P, CI can cause significant damage to confinement tube 3 and stirring system 4 under long duration operating conditions, and more particularly in a region located on the shaft of the stirring system, in a so-called supercritical/subcritical transition zone. In addition, bending loads experienced by the stirring system are significant in this particular region. This region of the shaft is therefore subject to a combination of mechanical, thermo-hydraulic and even thermo-galvanic effects, in addition to the phenomena of conventional generalised corrosion and deposit corrosion. This combination induces a weakness in the stirring system, which can lead to a more frequent maintenance under some operating conditions.

Experimental tests have highlighted a weakness related to the absence of means for controlling overheating and heat transfers all along the reactor, despite the existence of strong thermal power releases along the reactor enclosure, due to the rapid occurrence of the oxidation reaction of organic compounds in supercritical water. In reactors of prior art, it is possible to carry out a temperature measurement in annular zone 10 at right angles with organic waste injection. However, this temperature measurement only makes it possible to manage an additional cold flow of water or water/oxidant mixture in order to avoid pyrolysis in the injection line dipped into the reaction medium, in the case of HTO treatment of high NCV solvents. This type of measurement results in hot HP connections on the reactor enclosure, the present invention is intended to avoid.

DISCLOSURE OF THE INVENTION

The invention aims at improving a stirred double jacket continuous reactor of prior art, in particular by allowing better control of the reaction conditions in the reactor core, independently of the feed flow rate of water (reaction medium) and cold oxidants (air, pure oxygen, etc.).

For this, the invention aims in particular at improving the efficiency of heat transfers (heating and cooling) by acting on the forced circulation of the oxidising fluid, which is used as a coolant, as well as on the means for controlling power released by the reaction, heating means and temperature monitoring. The invention also aims at improving the efficiency of heat transfers (heating and cooling) by acting on waste introduction into the reaction zone.

Thus, the invention relates to a reactor for the hydrothermal oxidation treatment of an organic material in a reaction medium (which may be a supercritical medium), the reactor comprising:
- an enclosure delimiting a cavity in which is housed a confinement member defining an internal zone, called a confinement zone, for containing the reaction medium, and an external zone, called a peripheral zone;
- at least one oxidising fluid inlet to introduce an oxidising fluid into the peripheral zone;
- at least one first cooling system configured to cool the oxidizing fluid at the oxidizing fluid inlet in a first portion of the peripheral zone, so as to define a cold peripheral zone;
- at least one heating system to heat the oxidising fluid in a second portion of the peripheral zone, prior to its introduction into the confinement zone, so as to define a hot peripheral zone; and
- at least one organic material introduction channel in the confinement zone for introducing a loaded fluid, comprising organic material and water, said introduction channel being provided with an introduction mouthpiece through which the loaded fluid is introduced into the introduction channel;
- a confinement zone outlet for discharging effluents produced in the confinement zone from the enclosure;
the reactor being characterised in that it further comprises:
- an introduction channel stirring system adapted to create turbulence in the fluid loaded into the introduction channel;
- at least one second cooling system adapted to create, in the loaded fluid, a temperature gradient along the introduction channel between a so-called cold temperature, lower than a reaction temperature prevailing in the confinement zone, and the reaction temperature;

and the reactor being characterised in that the first cooling system is an outer circulation cold loop having a fluid inlet and a fluid outlet opening into the cold peripheral zone, and the heating system is an outer circulation hot loop having a fluid inlet and outlet opening into the hot peripheral zone, each circulation loop being equipped with a circulator and a heat exchanger, and having as a coolant the oxidising fluid circulating in the peripheral zone, an element being placed in the peripheral zone to separate the cold and hot loops, while allowing the oxidising fluid to pass from the cold peripheral zone to the hot peripheral zone.

It is set out that effluents that are produced in the confinement zone and discharged from the enclosure through the outlet of the confinement zone are effluents that are produced by hydrothermal oxidation treatment of the organic material in the reaction medium; in other words, they are effluents that are produced by the HTO or WO reaction.

As known from prior art, a confinement member can be a tube and is used to delimit, within the cavity of the enclosure, the confinement zone from the peripheral zone.

The element that is placed in the peripheral zone has the function of separating the cold and hot loops by creating a resistance to the flow of oxidizing fluid from the cold peripheral zone to the hot peripheral zone.

The loaded fluid contains water and organic material, the organic material may be solid or liquid and may or may not be miscible with water.

The temperature gradient is between the waste introduction temperature (preferably at ambient temperature) and the temperature required for the WO or HTO reaction.

It is reminded that, within the scope of the present invention, when a process is referred to, it is the process of waste (organic material) destruction by the hydrothermal pathway. The waste destruction process by the hydrothermal pathway uses the WO or HTO reaction, i.e. the combustion reaction in sub- or super-critical water, respectively.

As for the reaction medium, it is the mixture of water, waste and oxidant reagents which, when brought to the operating pressure and temperature conditions, will spontaneously carry out the expected combustion reaction.

Some preferred but not limiting aspects of this reactor are the following:
- the stirring system comprises a first stirring element extending into the introduction channel, said first stirring element preferably being integral with a stirring system in the confinement zone; this may for example be a rotating shaft;
- the introduction channel is at least partly housed in a passage for the oxidising fluid, the oxidising fluid circulating in said passage between the second cooling system and the heating system, so as to create the temperature gradient between the cold temperature and the reaction temperature;
- the reactor further comprises a mixing zone in which the organic material and an aqueous fluid are mixed to form the loaded fluid, said mixing zone being upstream of the introduction mouthpiece; preferably the organic material and the aqueous fluid are mixed cold, that is without being heated beforehand;
- the stirring system further includes a second stirring element arranged in the mixing zone, the second stirring element being preferably integral with the first stirring element; it may be for example a turbine blade;
- the circulators of the cold and hot loops are a double circulator, common to both loops;
- the reactor further comprises a loop for recycling effluents produced in the confinement zone, this recycling loop connecting the outlet of the confinement zone to a fluid inlet located upstream of the introduction mouthpiece of the introduction channel; preferably, the fluid inlet opens into the mixing cavity;
- the second cooling system is a chilled water fed double jacket, located at right angles with the introduction channel, downstream of the introduction mouthpiece;
- the introduction channel and the confinement member are integral and coaxial with each other, the enclosure comprising a first portion, in which the confinement member is housed, and a second portion, in which at least part of the introduction channel is housed, the first and second portions being coaxial and the second portion having a cross-section area at least half the cross-section area of the first portion.

The invention has many advantages. The improvements provided make it possible in particular:
- to be able, at a given reaction volume, to significantly increase the continuous treatment capacity of organic material with low to high NCV;
- to improve instrumentation possibilities as close as possible to the reaction, or in other words, to perform temperature monitoring (for example in the hot loop), in order to increase reaction efficiency while ensuring integrity of the pressurised reactor;
- to allow thermal control of the HTO at the desired flow rate, irrespective of the oxidising fluid feed conditions;
- to ensure efficient and continuous cooling of HTO reaction products;
- to increase the availability of the reactor (in particular, on the one hand, by reducing the maintenance time of the inner components (confinement tube and stirring system) and, on the other hand, by limiting the number of connections under pressure and at variable temperatures); this is achieved in particular by improving robustness of the components used in the process by acting on the introduction of organic material (waste) into the reaction zone;
- to improve control of the combustion reaction by improving the efficiency of the thermal power discharge (or injection) means at the reaction zone in the confinement tube;
- to simplify dimensioning of pressurised components, in particular heating and cooling components, by separating these functions from the HTO reaction function, and thus to simplify its extrapolation to larger sizes; in particular, this makes it easy to contemplate extrapolation to an industrial-scale reactor, which is restrictive in terms of dimensioning and environment;
- to efficiently extract thermal power released by the oxidation reaction from the organic material to transfer it to a secondary circuit and make use of it.

BRIEF DESCRIPTION OF THE DRAWINGS

Further aspects, purposes, advantages and characteristics of the invention will become clearer upon reading the following detailed description of the preferred embodiments of the invention, given by way of non-limitative example and made with reference to the appended drawings in which.

DETAILED DISCLOSURE OF SPECIFIC EMBODIMENTS

Figure 2:
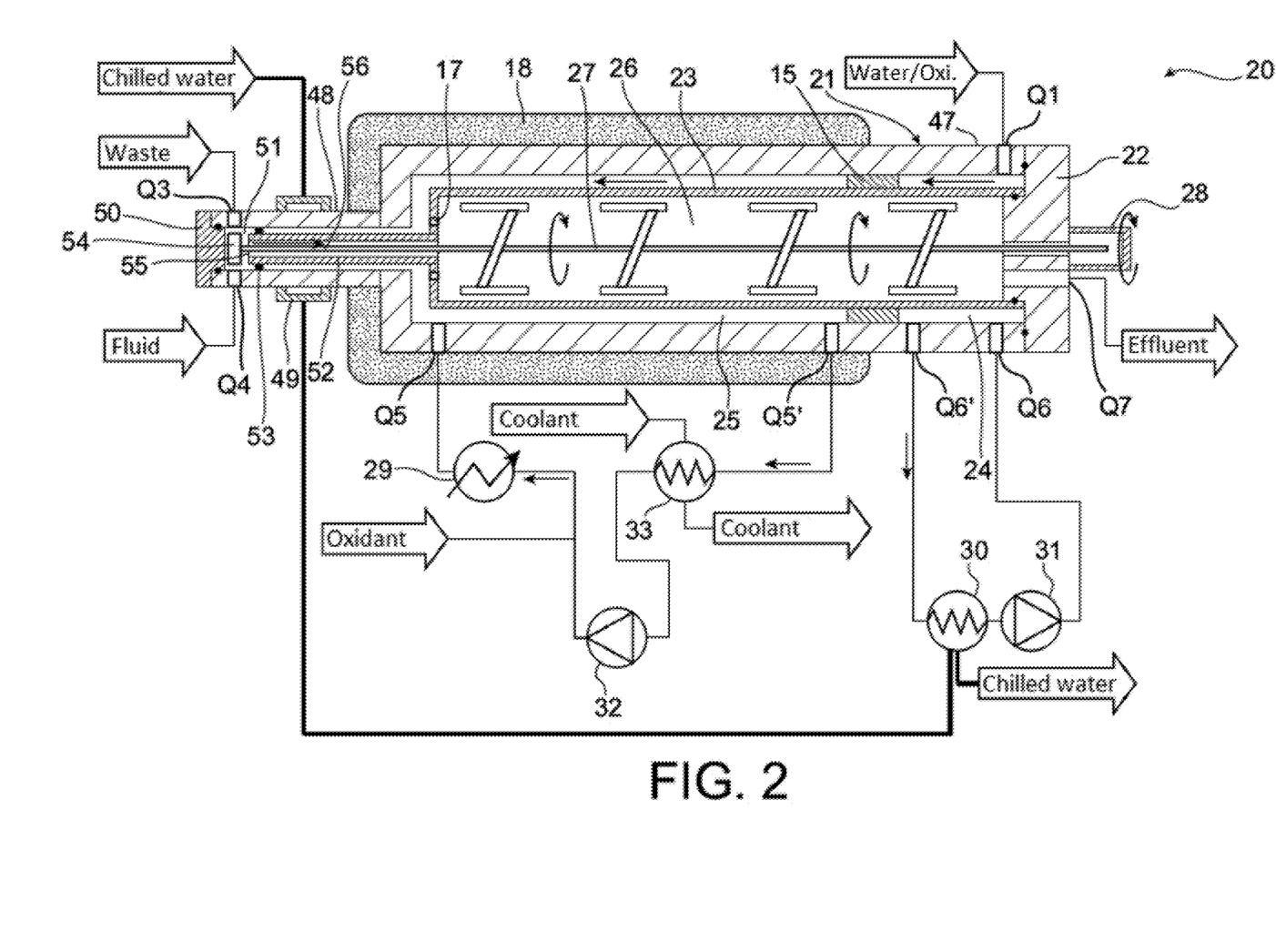
FIG. 2 represents a cross-section view of a first embodiment of a reactor according to the invention.

A schematic view of a reactor 20 according to one embodiment of the invention is represented in FIG. 2.

The enclosure 21 of the reactor 20 delimits a longitudinal-shaped open cavity, closed by an interface flange 22, kept at ambient temperature.

As in prior art, a confinement member 23 (for example a tube) is placed inside the cavity of enclosure 21 and tightly mounted to the flange 22. This confinement member 23 delimits a peripheral zone (which is an annular zone, when the enclosure and confinement body are tubular), between its upper surface and the cavity of enclosure 21, and an internal confinement zone 26, which is in fluid communication with the peripheral zone through at least one opening 17 (located on the hot side of enclosure 21), and which contains the reaction medium.

The peripheral zone includes a cold peripheral zone 24, located at the flange 22, and a hot peripheral zone 25, covered with a heat-insulating coating 18.

Confinement member 23 is static in relation to the pressurised enclosure 21 of the reactor, and the reaction mixture located inside confinement member 23 is maintained under mechanical stirring as in document [1], using a stirring system 27, for example a rotating shaft with blades, rotatably driven by a magnetically driven motor 28.

Figure 3:
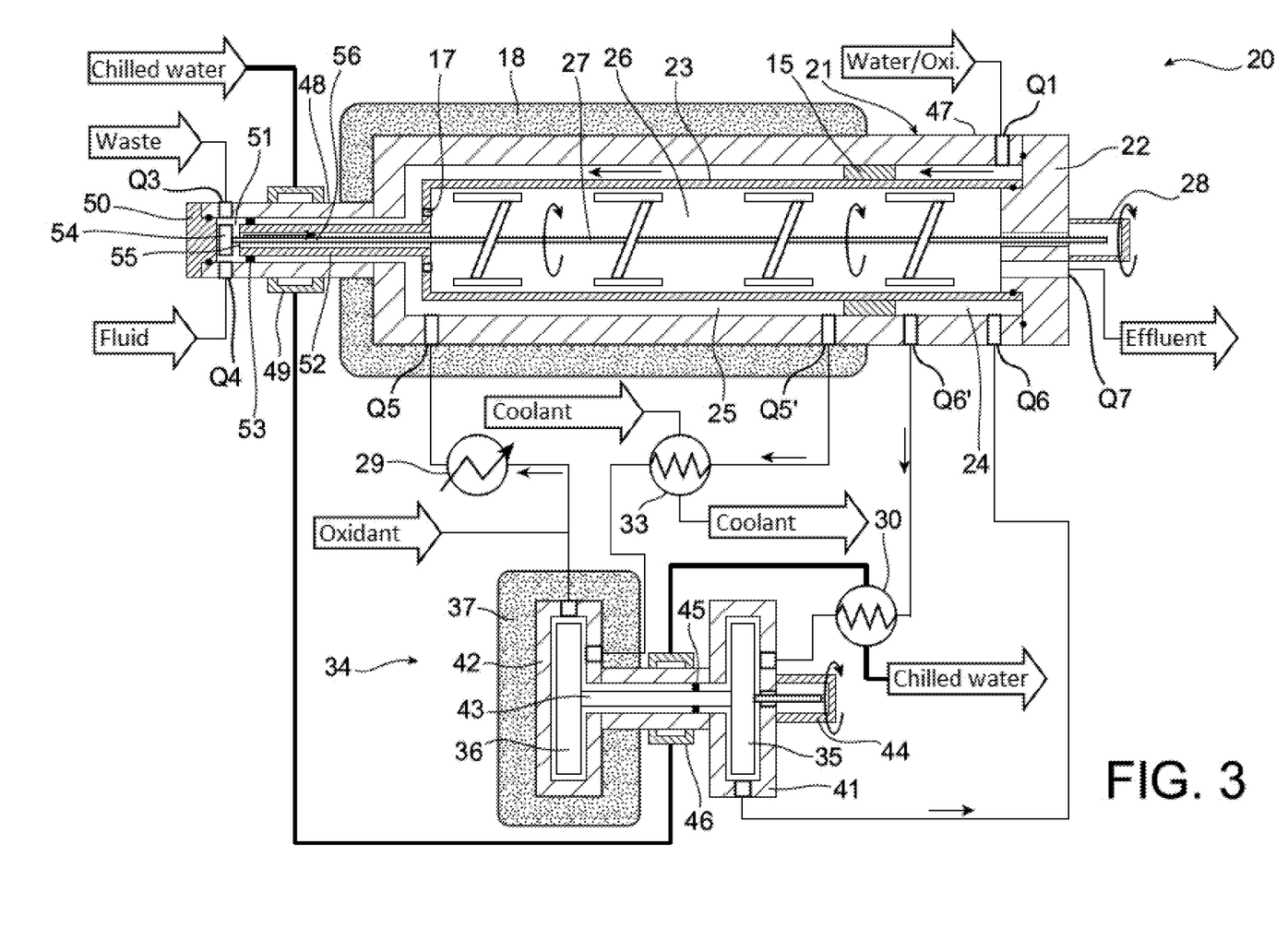
FIG. 3 represents a cross-section view of a second embodiment of a reactor according to the invention, this second embodiment being an alternative of the first embodiment using a double circulator.

The water forming the reaction medium is introduced at (Q1) at the operating flow rate and travels in the peripheral zone between the upper surface of confinement member 23 and the wall of enclosure 21. The oxidant required for the WO or HTO reaction, regardless of whether it is air, oxygen, hydrogen peroxide, etc., may also be introduced in whole or in part at (Q1). In FIGS. 2 and 3, the oxidant is introduced partly into (Q1) and partly into the hot loop (Q5-Q5').

Finally, a mixture that will be referred to as "oxidising fluid", formed by water and oxidant necessary for the reaction, circulates in the peripheral zone until it enters the confinement zone through openings 17.

Figure 4:
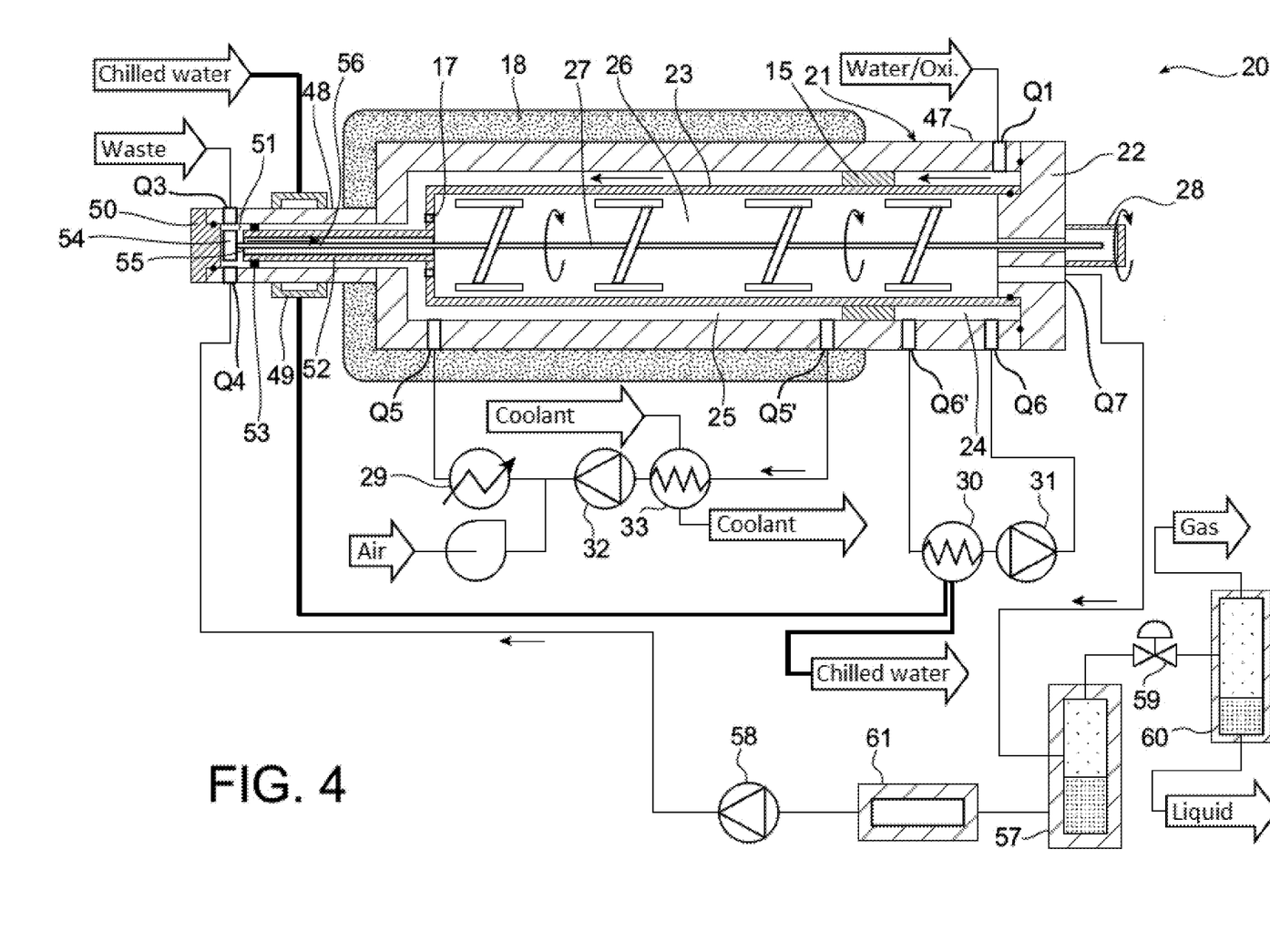
FIG. 4 represents a cross-section view of a third embodiment of a reactor according to the invention, this third embodiment allowing recycling of aqueous effluents.

In the present invention, waste introduction into the reaction zone (i.e. confinement zone 26) is improved by introducing waste to be treated into this confinement zone 26 through high pressure connections kept at low temperature. To do this, the enclosure includes, as illustrated in FIGS. 2, 3 and 4, a first portion 47, which extends at its hot end to a second portion 48 having a small cross-section area. Preferably, these are coaxial tubular portions. On the second portion 48, a second cooling system 49 is installed at a distance from the hot end of the first portion 47 and outside the heat-insulating coating 18, which is capable of keeping this second portion at ambient temperature; this may, for example, be a double jacket actively cooled by circulating chilled water.

According to a preferred configuration, the free end of this second portion 48 can be opened and closed by a plug type closure system 50 with an elastomer seal providing tightness of the enclosure at the operating pressure of the HTO or WO process. Opening this plug 50 gives ready access to a mixing cavity 51 into which the connections of feeds Q3 and Q4 open. The plug type closure system only has to withstand pressure stress and chemical reagents, but not temperature.

As illustrated in FIGS. 3 to 5, the confinement member 23, present in the cavity in the first portion 47 of the enclosure, tightly extends in the second portion 48 of the enclosure, to an introduction channel 52 which extends beyond the second cooling system 49. Tightness between the introduction channel 52 and the second portion 48 of the enclosure is provided by a seal 53, for example a cable gland, disposed between these two elements in the cold part.

The material of seal 53 is made for example of Teflon™, so that it can withstand possible chemical aggression of the waste to be treated, at operating pressure, but at ambient temperature. Like the assembly formed by the introduction channel 52 and the confinement member 23, seal 53 performs its tightness function with a low differential pressure at operating pressure. In addition, it enables axial differential expansion to be accommodated between the first portion 47 of the enclosure and the confinement member 23 (and therefore between the second portion 48 of the enclosure and the introduction channel 52), mechanically connected to flange 22.

A stirring system is placed in the introduction channel to create turbulence in the fluid (waste) flowing through it. Preferably, the turbine-type stirring system 27, which stirs the inside of the confinement member 23, is also extended by means of an axis 56 which runs through the introduction channel 52 until it reaches the mixing cavity 51. At the mixing cavity 51, a stirring part 54, for example a blade, is mounted to the stirring system 27.

Mixing cavity 51, at operating pressure, is kept cold by the action of the second cooling system 49 (cooled double jacket). The waste can be continuously introduced cold by a high pressure pump at connection (Q3), possibly with another fluid via connection (Q4), to which it is cold mixed by the stirring part 54. This mixture is kept under stirring in the mixing cavity 51, then enters the introduction channel at a mouthpiece 55 and gradually heats up beyond the second cooling system 49, finally ending up in the reaction zone (i.e. the confinement zone 26) within the confinement member 23 and be mixed with the other, preheated reagents (water, oxidant) and also introduced into this reaction zone, but from the peripheral zone located on the upper surface of the confinement member via the openings 17. The combustion reaction then occurs spontaneously under stirring in the confinement member 23.

Preferably, the introduction channel is a small diameter tube.

During the waste heating phase, the waste flows through an annular space between turbine axis 56 and introduction channel 52. Thus, potential fouling due to salt precipitation beginnings or pyrolysis is limited by the movement of axis 56.

Thus, in the present invention, it has been possible to improve the robustness, with respect to mechanical stress under operating conditions, of the components required for the introduction of waste into the reaction medium by performing connection of the high pressure injection lines to actively cooled passages, while ensuring that the fluids and waste introduced by these injection lines do not lead to an obstruction harmful to the operation of the process (an obstruction in the introduction channel being prevented in particular by heating under mechanical stirring by element 56).

Part of the connections is also made to the closing flange 22, which is kept cold by the circulation loop (Q6-Q6'). In order to inject part of the reagents as close as possible to the hot zone of the reactor into the confinement member 23, the waste injections (Q3) and (Q4) are carried out at the small cross-section area extension 48 of the enclosure on which a second cooling system 49 (double jacket) is installed. Because of this small cross-section area, it is easy to create a cold connection zone, stirred for example by a stirring part 54, integral with the stirring system 27 of the confinement zone 26, and allowing these reagents to be introduced via a passage, that is stirred and with a small communication cross-section area, formed between the introduction channel 52 and the axis 56.

Two tappings (Q6 and Q6') made in the enclosure wall on the side of flange 22 allow the connection of an external cold fluid circuit from the peripheral zone (thus forming the cold peripheral zone 24). They define a segment of the enclosure where the fluids are kept at ambient temperature.

Two tappings (Q5 and Q5'), made in the wall of the enclosure at the heat insulated coating 18, allow the connection of an external hot fluid circuit from the peripheral zone (thus forming the hot peripheral zone 25). They define a segment of the enclosure where the fluids are kept at hot operating temperature.

Between the segments (Q5-Q5') and (Q6-Q6'), an element 15 is installed in the peripheral zone, acting as a diffuser to separate the cold and hot loops, while allowing the oxidising fluid to pass from the cold peripheral zone 24 to the hot peripheral zone 25. This element 15 creates a slight pressure drop in the flow in the peripheral zone from Q6' to Q5'.

The presence of the two circulation loops, i.e. the hot loop (Q5-Q5') located at right angles with the part where the reaction takes place, and the cold loop (Q6-Q6'), located at right angles with the part where the effluents are located before they are discharged into (Q7) of the reaction zone, makes it possible to improve heat exchanges between confinement member 23 and enclosure 21 of reactor 20, as compared with the reactor of prior art illustrated in FIG. 1.

These two loops use the fluid located at the upper surface of the confinement member in the peripheral zone as a coolant.

This coolant fluid is made up of all or part of the oxidising fluid, which corresponds to the mixture of water and oxidant (air, oxygen, $H_2O_2$, etc.) that is injected at (01) from outside the enclosure at the flow rate required by the expected combustion reaction. During its circulation, this coolant fluid contributes to the cooling of the reaction effluents which circulate in counter-current in confinement zone 26 of the confinement member 23, is preheated by the release of thermal power from the combustion reaction taking place in confinement zone 26 of confinement member 23, and enters this confinement zone 26 upstream of the reaction at the openings 17. Thus:
- the confinement of the reaction is dynamically ensured in the confinement member 23;
- the pressure drop upon introducing the oxidising fluid through openings 17 is minimised by the fact that at this introduction through openings 17, the oxidising fluid is, in the case of HTO, supercritical, and therefore of a very low viscosity, thus making it possible to design a confinement member 23 operating at almost equipressure between its lower surface and upper surface, which can thus be relatively thin, and be a very efficient heat exchanger.

The use of the oxidising fluid as a coolant fluid thus enables the confinement member 23 to be used as a highly efficient heat exchanger between both circulation loops (Q5-Q5') and (Q6-Q6') outside confinement member 23, on the one hand, and the reaction mixture inside confinement member 23, on the other hand.

The efficiency of confinement member 23 as an exchanger is due, on the one hand, to the fact that, on either side of the wall of this confinement member, the fluids have a highly turbulent flow due to i/mechanical stirring in confinement zone 26 using the stirring system 27 and ii/the forced circulation in the external loops (Q5-Q5' and Q6-Q6'), and on the other hand, to the fact that the thickness of the confinement member is small, having only to withstand low differential pressures under operating conditions.

It should be noted that it is possible to inject possibly further water and/or oxidant in either of the outer loops. For example, in FIG. 4, additional oxidant is injected into the hot loop (Q5-Q5').

The cold circulation loop (Q6-Q6') is cooled by an outer exchanger 30 fed by a cold source, for example chilled water, and is circulated by the cold circulator 31, which enables the upper surface of the confinement 23 to be cooled, and consequently effluents from the reaction zone, before being discharged from enclosure 21. In addition, this cold circulation loop (Q6-Q6') makes it possible to keep flange 22 at a low temperature (i.e. a temperature below 100° C.), and allows the use of a seal without any particular thermal performance to provide tightness between reactor enclosure 21 and this flange 22.

The hot circulation loop (Q5-Q5') is circulated by a hot circulator 32, and communicates the upper surface of the confinement member 23 at right angles with the zone (Q5-Q5') where the reaction takes place, a heater 29, and a hot exchanger 33, both outside the enclosure. The heater 29 enables the oxidising fluid to be brought to the operating temperature during the reaction start-up phase, and the temperature of the reaction zone (i.e. the confinement zone 26) to be kept when the power released by the combustion reaction is insufficient to ensure preheating of the reaction fluids (water, oxidiser, waste).

The hot exchanger 33 enables the oxidising fluid to be actively cooled at the end of operation and the excess thermal power produced by the combustion reaction to be extracted to a cold source in order to maintain stable operating conditions for the combustion reaction, even in auto-thermal operation. The thermal power extracted from this hot loop may also be utilised by a thermal machine, the exchanger 33 of which is the hot source.

At the confinement member 23, these two coolant fluid circuits are separated by an element 15 acting as a diffuser, which enables the short circuits between these two circulation loops to be limited, while allowing the oxidising fluid to be transferred, as a net balance, in counter-current from the cold flange 22 of the reactor 20 to the head of the hot zone at the openings 17. This diffuser element 15 can, for example, be made of metal frit, metal packing, mineral or metal foam. The net flow rate of the oxidising fluid through the diffuser element 15 is relatively low and the pressure drop induced by this diffuser element between the two coolant loops is therefore small (a few Pa).

According to one embodiment illustrated in FIG. 3, circulating these two circulation loops can be carried out by a double circulator 34. This double circulator 34 is provided with a hot zone, heat insulated by a coating 37, containing a hot turbine 36 housed in a compartment 42 withstanding the operating pressure and service conditions at operating temperature of the process for the coolant fluid it contains. It is reminded that the operating temperature is the desired temperature for the combustion reaction to occur in the reaction zone. This double circulator is also provided with a not heat insulated, cold zone containing a cold turbine 35 housed in a compartment 41 withstanding the operating pressure and the ambient temperature of the coolant fluid it contains.

The hot turbine 36 and the cold turbine 35 operate on hydraulic circuits which are at the same operating pressure, due to the presence of the diffuser element 15. These turbines are mounted to the same motor axis 43, which is itself moved by a magnetic drive 44 mounted to this axis at the compartment 41. Short circuits between the two coolant loops at the double turbine are easily avoided by fitting a rotary gasket 45 on the motor axis 43. The hot and cold sectorization on this double turbine is ensured by a simple double jacket 46, installed on the external surface of the turbine body, at right angles with the motor axis 43.

In the present invention, the strategy to improve control of the thermal power released by the WO or HTO reaction and to control the maintenance of operating conditions (heat treatment means (heaters, coolers, exchangers, etc.) and temperature monitoring means), consisted, through the creation of external hot and cold coolant loops, in offsetting these functions to dedicated equipment located outside the reactor enclosure, while ensuring efficient thermal coupling of the WO or HTO reaction with this equipment through a relatively thin confinement member, made possible by the use, as a coolant, of the oxidising fluid feeding the expected reaction. In other words, the confinement member has an optimised heat exchanger function due to the fact that its coolant is the oxidising fluid which is at operating conditions (temperature and pressure) close to those of the reaction occurring inside the confinement member.

The heater 29 is made by means known to those skilled in the art (electric heating resistor on high pressure circuit, burner, etc.). The same applies to the cold exchanger 30, which is made, for example, by circulating the high pressure circuit in a water box cooled by a cold source.

The hot exchanger 33 can be the hot source of a thermal machine for making use, via a coolant loop, of the excess thermal power released by the WO or HTO reaction, these technologies being known to those skilled in the art.

The reactor improved according to the invention also allows the implementation of effluent recycling, the aqueous effluents from the process being reintroduced to feed the reaction. A known limitation of the continuous HTO or WO processes is that the organic waste combustion reaction is carried out with a significant waste dilution in the water medium (from 1 to 10% by mass classically). The consequence is that for an organic flow rate to be treated, the reaction requires a minimum flow rate of injected water.

If the process environment is restricted from the point of view of the flow rate of effluents produced, it is contemplatable that it is particularly advantageous to reuse the effluent produced (containing mainly water, mineral salts present in the initial waste, and traces of organic elements that have not completely reacted) to feed the aqueous phase process. This recycling thus makes it possible to reduce the net balance of the effluent flow produced in relation to the treated waste flow.

As the effluents produced are not only water, it cannot be excluded that their composition is harmful to the reactor's performance, so it is potentially harmful to introduce them, for example via the tapping (Q1). The creation of the mixing cavity 51 makes it possible to introduce this recycled effluent into the reaction zone with the waste to be treated, from a zone kept cold, into the confinement member 23 via the introduction channel 52. Axis 56, located in the introduction channel, allows the recycled effluent to be heated, while limiting impact of the precipitation of any salts it may contain on plugging or corrosion of the introduction channel.

One embodiment of the reactor according to the invention with an effluent recycling loop is illustrated in FIG. 4. At the outlet (Q7) of the enclosure a liquid gas separator 57 is installed at the operating pressure of the reactor. At the bottom of this separator 57, a fraction essentially comprised of aqueous phase is continuously picked up by a positive displacement pump 58 to be injected at (Q4). At the top of this separator 57, an operating pressure regulation system represented by a regulation valve 59 is positioned, controllably purging the volume under pressure to a low pressure gas/liquid separator 60.

If necessary, the recycled fluid can undergo treatment at operating pressure before being reused. This treatment will be carried out in a component 61, which may be, for example, a filter to limit the reintroduction of particles or a fixed or mobile bed of elements for retaining all or part of the soluble salt load of the aqueous effluent and limit its reintroduction at the reactor top.

Finally, strong points of the different improvements of the reactor according to the invention are the following:

the removal of all the HP connections providing pressure tightness of the reactor enclosure, located in the proximity of the HTO or WO reaction zone and/or under temperature, whether for the injection or extraction of fluids or for taking measurements (temperature, pressure). The introduction of waste organic material in (Q3) is carried out in the cold zone created at the mouthpiece 55 of the introduction channel. This new configuration provides tightness at operating pressure and when cold;

a configuration making it possible to improve the efficiency of heat transfers with the reaction medium by means of a cold circulator 31 and a hot circulator 32 that are external to the reactor enclosure, preferably by means of a double circulator 34 external to the enclosure, making it possible to create a cold loop and a hot loop the coolant of which is the oxidising fluid comprised of water and the oxidant (a mixture called oxidising fluid) for reacting, in the reaction zone, with the organic waste to be destroyed;

a configuration in which the cold loop allows the effluents from the process to be cooled using the coolant to cool them through the confinement member, which has a thin wall and efficient heat exchange, due to i/the low pressure gradient on either side of this member under nominal operating conditions, ii/the speed and turbulence of the coolant flow controlled by a dedicated circulator 31, iii/the turbulence of the reaction fluid flow controlled by mechanical stirring (by the stirring system 27) of said reaction fluid;

a configuration where the hot loop allows homogeneous operating temperature conditions to be kept in the zone where the organic waste combustion reaction takes place; this homogeneity is ensured by extracting or supplying calorific power through the wall of the confinement member 23 the wall of which is thin and efficient heat exchange, due to i/the low pressure gradient on either side of this member in nominal operating conditions, ii/the speed and turbulence of the coolant flow controlled by a dedicated circulator 32, iii/the turbulence of the reaction fluid flow controlled by mechanical stirring (by stirring system 27 of the reactor). This configuration makes it possible to maximise, at a given volume under pressure in the reactor, the useful volume for conducting the HTO or WO reaction;

a configuration where the hot loop allows the excess power released by the HTO or WO reaction to be extracted from a hot source at the operating temperature of the process, allowing this power to be utilised in a thermal machine;

a configuration where both circulation functions of coolant fluid, cold circulation 31 and hot circulation 32, are provided by a single pressurised component (double circulator 34), both circuits operating at a very slight pressure difference, these two circuits being separated by a tight gasket 45 on the double circulator side, and by a diffuser element 15 on the reactor enclosure side. The circulators are rotated via a motorised magnetic drive coupled to the cold side of the double circulator;

a configuration where temperature monitoring to ensure that the pressurised reactor operates within an acceptable range is simplified by taking the temperature in the hot loop (Q5-Q5') outside the enclosure, for example at the connection (Q5');

a configuration in which the design of the enclosure and its inner elements (mainly the geometry and exchange surface areas of the confinement member 23 serving as heat exchanger) is simplified, by offsetting heating and cooling functions to specialised equipment, with a very efficient and easy to achieve thermal coupling because the coolant circuits (Q5-Q5') and (Q6-Q6') are made with the oxidising fluid at operating pressure;

a configuration where the injection of the reagents is carried out by the connections kept cold on the reactor enclosure where the combustion reaction takes place. The waste is pre-mixed at ambient temperature and operating pressure in a cold volume (mixing cavity 51) and communicated with the confinement member 23 confining the reaction at operating temperature and pressure via an integral piping (introduction channel), and preferably of the same material as confinement member 23 and held under mechanical stirring by axis 56, as an extension of the axis of the stirring system 27 of confinement member 23, and leaving a small passage cross-section area where heating of the reagents will not lead to build-up of partially reacted products;

a configuration allowing easy implementation of reuse at operating pressure of all or part of the effluents from the reaction to form the reaction medium; through the stirred volume (mixing cavity 51), these effluents, which are potentially not made up solely of pure water, and which may therefore contain elements that may degrade the enclosure by corrosion or precipitation, are injected at (Q4), into the reaction volume confined by the confinement member 23, at a distance from the walls of the enclosure, being mixed when cold and at operating pressure with the waste introduced through the tapping (Q3) into a space located before the mouthpiece 55 of the introduction piping. This configuration makes it possible to reduce the net balance of water consumption or aqueous effluent production during the organic waste treatment by HTO or WO, while i/limiting the energy expenditure for compressing the fluids feeding the process and ii/ensuring robustness of the process in relation to the use of this effluent flow.

REFERENCES CITED

[1] WO 02/30836 A1
[2] WO 2007/036526 A2
[3] WO 2014/111581 A1

What is claimed is:

1. A reactor for the hydrothermal oxidation treatment of an organic material in a reaction medium, the reactor comprising:
   an enclosure delimiting a cavity;
   a confinement member, which is housed in the cavity, the confinement member defining an internal confinement zone for containing the reaction medium, and an external peripheral zone;
   at least one oxidizing fluid inlet for introducing an oxidizing fluid into the external peripheral zone;
   at least one first cooling system configured to cool the oxidizing fluid at the oxidizing fluid inlet in a first portion of the external peripheral zone, so as to define a cold peripheral zone;
   at least one heating system for heating the oxidizing fluid in a second portion of the external peripheral zone, prior to its introduction into the internal confinement zone, so as to define a hot peripheral zone; and
   at least one introduction channel for introducing a loaded fluid, comprising the organic material and water, into the internal confinement zone, said introduction channel being provided with an introduction mouthpiece through which the loaded fluid is introduced into the introduction channel;
   an outlet from the internal confinement zone for discharging effluents produced in the internal confinement zone from the enclosure;
   the confinement member having two opposing ends, one end being located in the cold peripheral zone and the other end being located in the hot peripheral zone;
   the internal confinement zone and the external peripheral zone being in fluid communication via at least one opening arranged in the end of the confinement member located in the hot peripheral area;
   wherein the reactor further comprises:
      a stirring system of the introduction channel adapted to create turbulence in the loaded fluid in said introduction channel;
      at least one second cooling system adapted to create, in the loaded fluid, a temperature gradient along the introduction channel between a cold temperature, lower than a reaction temperature prevailing in the internal confinement zone, and the reaction temperature;
      a mixing zone in which the organic material and an aqueous fluid are mixed to form the loaded fluid, said mixing zone being upstream of the introduction mouthpiece;
   and wherein the first cooling system is an outer circulation cold loop having a fluid inlet and a fluid outlet opening into the cold peripheral zone, and the heating system is an outer circulation hot loop having a fluid inlet and a fluid outlet opening into the hot peripheral zone, each circulation loop being equipped with a circulator and a heat exchanger, and having as a coolant the oxidizing fluid circulating in the external peripheral zone, an element being placed in the external peripheral zone to separate the cold and hot loops, while allowing the oxidizing fluid to pass from the cold peripheral zone to the hot peripheral zone.

2. The reactor according to claim 1, wherein the stirring system comprises a first stirring element extending into the introduction channel.

3. The reactor according to claim 2, wherein the stirring system further comprises a second stirring element arranged in the mixing zone.

4. The reactor according to claim 1, wherein the introduction channel is at least partly housed in a passage for the oxidizing fluid, the oxidizing fluid circulating in said passage between the second cooling system and the heating system, so as to create the temperature gradient between the cold temperature and the reaction temperature.

5. The reactor according to claim 1, wherein the circulators of the cold and hot loops are a double circulator common to both loops.

6. The reactor according to claim 1, further comprising a recycling loop for the effluents produced in the internal confinement zone, the recycling loop connecting the outlet of the internal confinement zone to a fluid inlet located upstream of the introduction mouthpiece of the introduction channel.

7. The reactor according to claim 1, wherein the second cooling system is a double jacket fed by chilled water, located at right angles with the introduction channel, downstream of the introduction mouthpiece.

8. The reactor according to claim 1, in which the introduction channel and the confinement member are integral and coaxial with each other, the enclosure comprising a first portion, in which the confinement member is housed, and a second portion, in which at least part of the introduction channel is housed, the first and second portions being coaxial and the second portion having a cross-section area at least half the cross-section area of the first portion.

9. The reactor according to claim 2, wherein the first stirring element is integral with a stirring system of the internal confinement zone.

10. The reactor according to claim 3, wherein the second stirring element is integral with the first stirring element.

* * * * *